United States Patent
Skoglund et al.

[11] Patent Number: 5,234,025
[45] Date of Patent: Aug. 10, 1993

[54] PARTITIONED FLOW REGULATING VALVE

[76] Inventors: Paul K. Skoglund, P.O. Box 848, Woodinville, Wash. 98072; Thomas J. Hilton, 11414-105th Pl. NE., Kirkland, Wash. 98033

[21] Appl. No.: 921,310

[22] Filed: Jul. 28, 1992

Related U.S. Application Data

[63] Continuation-in-part of Ser. No. 708,098, May 24, 1991, Pat. No. 5,143,116, which is a continuation-in-part of Ser. No. 540,297, Jun. 20, 1990, abandoned, which is a continuation-in-part of Ser. No. 448,552, Dec. 11, 1989, abandoned.

[51] Int. Cl.$^5$ ............................................. G01D 7/01
[52] U.S. Cl. ...................................... 137/501; 137/497
[58] Field of Search ........................ 137/501, 500, 497

[56] References Cited
U.S. PATENT DOCUMENTS

| | | | |
|---|---|---|---|
| 3,100,620 | 8/1963 | Kates | 137/501 X |
| 3,402,735 | 9/1968 | Kates | 137/501 |
| 4,074,693 | 2/1978 | Kates | 137/501 X |
| 4,250,915 | 2/1981 | Rikuta | 137/501 |
| 4,922,956 | 5/1990 | Taube, Sr. et al. | 137/501 |

*Primary Examiner*—John Rivell
*Attorney, Agent, or Firm*—Graybeal Jackson Haley & Johnson

[57] ABSTRACT

A substantially constant flow regulating valve includes a piston dividing a bore into two chambers. The piston is spring biased toward the top chamber of the bore. Fluid from the inlet enters the top chamber through a reference pressure passage and exerts a downward force on the piston. Fluid from the inlet also passes through an inlet flow throttle and into the bottom chamber of the bore where it exerts an upward force on the piston in concert with the spring force. The piston includes an end which variably interacts with an orifice in the lower chamber to maintain a constant pressure differential between the top and bottom chambers.

12 Claims, 2 Drawing Sheets

PARTITIONED FLOW REGULATING VALVE

This application is a continuation-in-part of U.S. patent application Ser. No. 07/708,098 filed, May 24, 1991, entitled FLOW REGULATING VALVE AND SYSTEM USING THE SAME, now U.S. Pat. No. 5,143,116, which is a continuation-in-part of U.S. patent application Ser. No. 7/540,297, now abandoned, filed Jun. 20, 1990, which is a continuation-in-part of U.S. patent application Ser. No. 07/448,552, filed Dec. 11, 1989 now abandoned.

BACKGROUND OF THE INVENTION

The present invention relates to valves for regulating fluid flow at a substantially constant rate and also relates to fluid piping systems employing these fluid flow regulating valves. The valve of the present invention provides a substantially constant fluid flow of a wide range (from 0.1 to over 30,000 gallons per minute) under extreme operating parameters where the pressure differential between the upstream and downstream pressures is large (up to 20,000 psi).

Flow regulating valves are known in the art. For example, the valve of South African Patent No. 77/2626 comprises a valve body having a through cavity, entrance and exit apertures, and an opening with variable opening area for varying the liquid flow rate through the valve. Inside the through cavity there is a membrane that divides the cavity into two sealed compartments. A conduit is provided inside the valve body which acts as a fluid communication link between the two compartments. Fluid flow control means in the conduit operates means for varying the size of the opening. Specifically, fixed to the base of the membrane is a conical-shaped plunger that can be inserted into the opening and spring means urging the plunger away from the opening.

The South African valve, however, unlike the present invention, is not able to provide substantially constant flow under extreme operating parameters.

Also known in the art is U.S. Pat. No. 4,250,914, which discloses a valve for controlling fluid flow having a cavity divided into first and second chambers by a first membrane carrying a plunger. The plunger has one end extending into the valve outlet opening at one wall of the first chamber. A second membrane acts between an end of the plunger and a wall of the second chamber and forms a third chamber in communication with fluid at the outside of the opening through a longitudinal conduit in the plunger. Inlet fluid is supplied to the first and second chambers by a manually operable flow control valve. The plunger position is dependent upon the difference in fluid pressures in the first and second chambers and varies the size of the opening. Fluid in the third chamber counterbalances the pressure of the fluid at the outlet on the end of the plunger.

Neither of these valves disclose a partitioned first valve chamber capable of accommodating different fluid pressures, which results in a valve having a more compact configuration. Also, neither of the above patents disclose a flow restriction point in a reference pressure passage as does the present valve. This flow restriction point minimizes "fluid packing" to allow valve responsiveness to be precisely adjusted over a wide range of flow rates despite fluctuating inlet pressures.

SUMMARY OF THE INVENTION

The present invention pertains to a valve for regulating fluid flow at a substantially constant rate under varying external pressures. In accordance with the present invention, a valve has a bore connected to an outlet, and a cavity connected to an inlet. A piston is located within the bore and divides the bore into a first chamber and a second chamber. The first chamber is subdivided into a first portion and a second portion. The first portion of the first chamber of the bore is connected to the cavity of the secondary body by a reference pressure passage. Fluid of a first pressure $P_1$ flows from the inlet into the cavity, through the reference pressure passage and into the first portion of the first chamber of the bore. The reference pressure passage includes a flow restriction point for varying the valve responsiveness to inlet pressure fluctuation.

The second portion of the first chamber and the second chamber are connected to the outlet and are also connected to the inlet by an opening having a variable flow cross-section. The flow cross-section of this opening is varied by an inlet flow throttle. Fluid flows from the inlet into the cavity, through the inlet flow throttle and into the second portion of the first chamber and the second chamber.

The piston is biased toward the first portion of the first chamber of the bore, in opposition to fluid pressure $P_1$, by one or more springs on a piston seat plate. The piston seat plate has an opening connecting the second chamber and the outlet. The piston has an end sized to allow the flow through this opening to fluctuate such that $P_2$, the pressure in the second chamber and the second portion of the first chamber, remains relatively constant. Pressure $P_2$ is the same value in both the second portion of the first chamber and the second chamber. Thus a constant pressure differential exists between the first and second chambers. The piston end maintains a constant differential pressure ($P_1 P_2$) in the second chamber by varying the flow cross-section of the piston seat opening. The fluid flow through the piston seat opening thus varies as the piston moves within the bore. As fluid flows along the outlet, the fluid has an outlet pressure of $P_3$.

BRIEF DESCRIPTION OF THE DRAWINGS

The novel features believed to be characteristic of this invention are set forth in the appended claims. The invention itself, however, may best be understood and its various objects and advantages best appreciated by reference to the detailed description below in connection with the accompanying drawings.

DESCRIPTION OF THE PREFERRED EMBODIMENT

Figure 1:
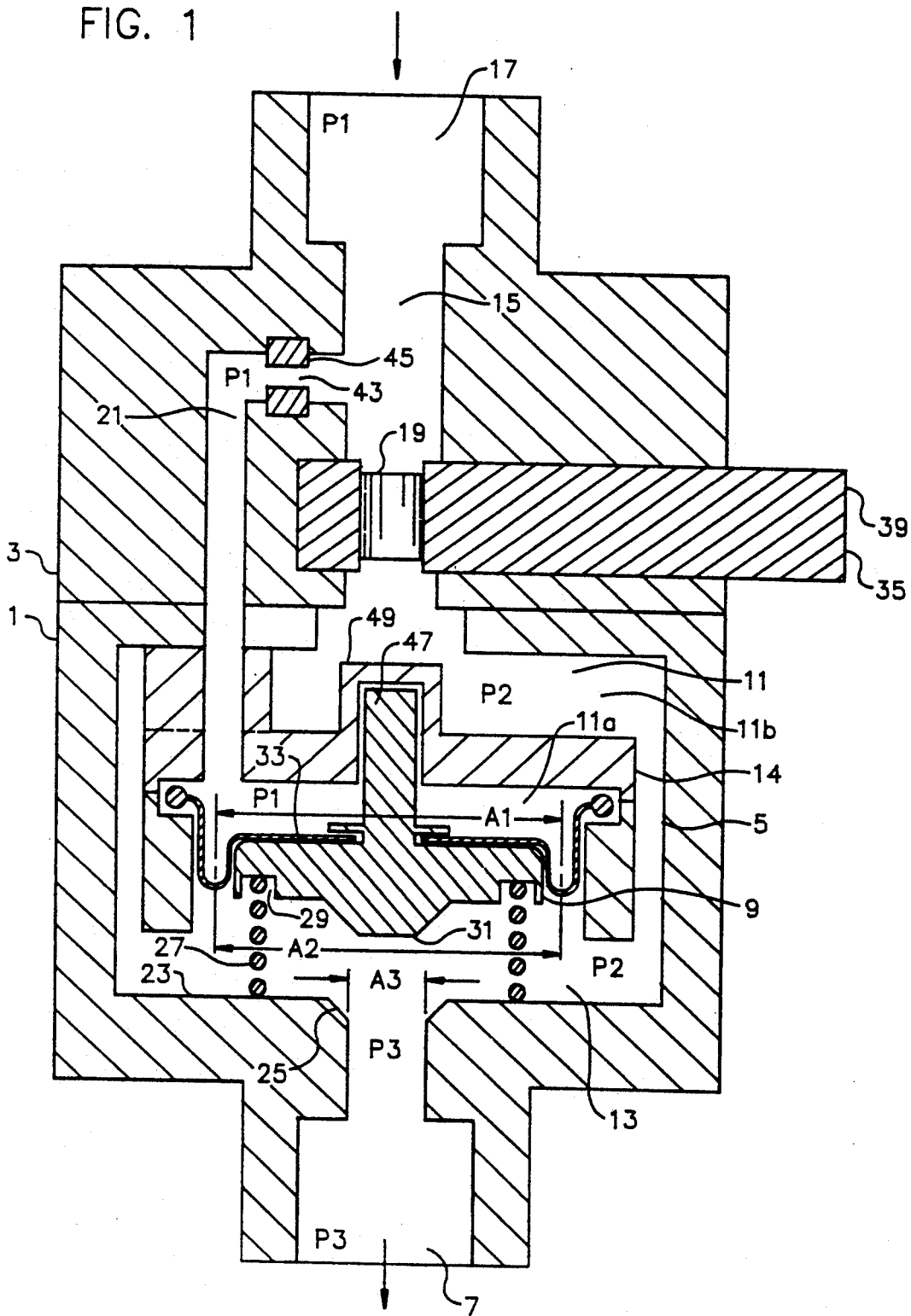
FIG. 1 is a longitudinal section of the flow regulating valve of the present invention.
Figure 2:
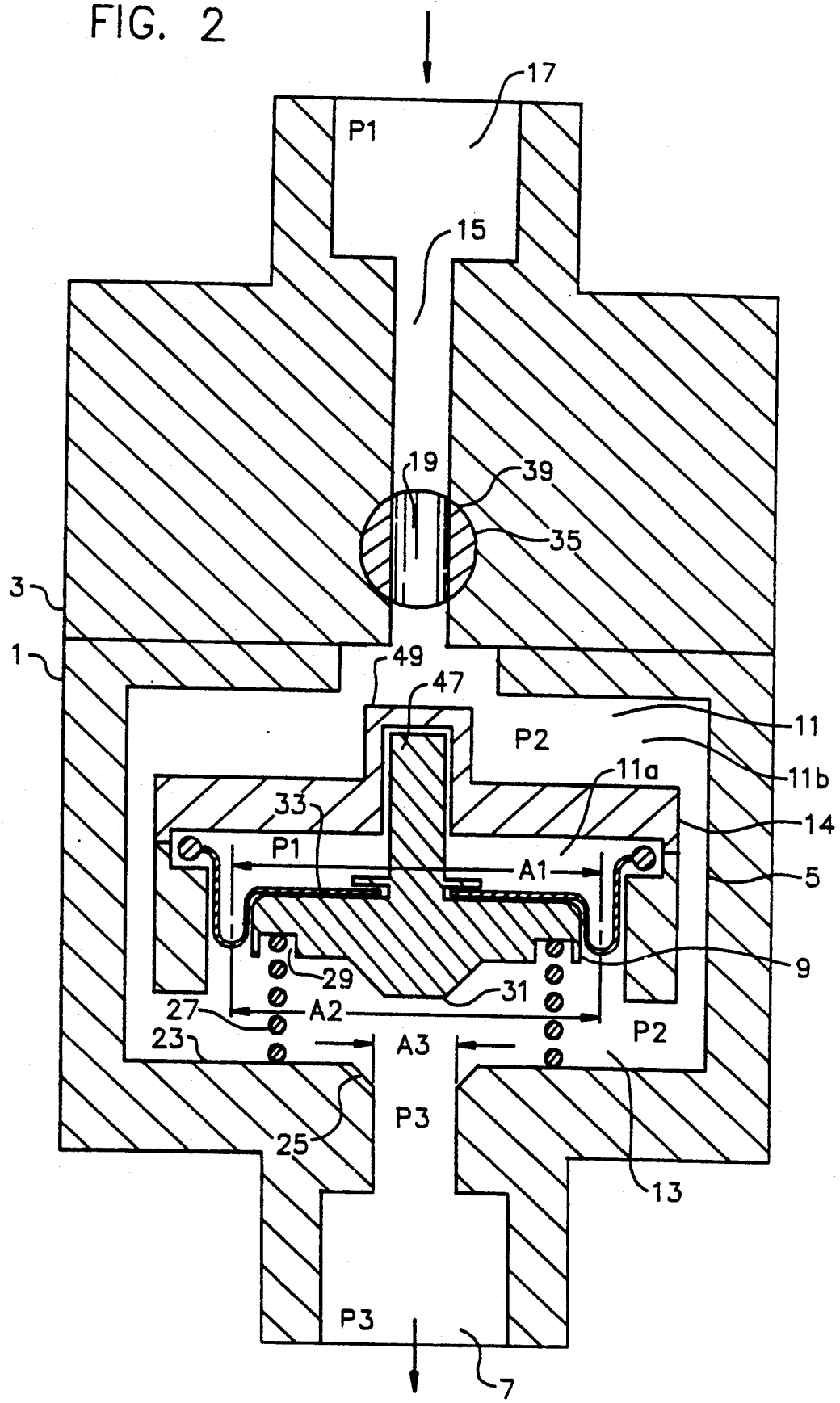
FIG. 2 is another longitudinal section of the flow regulating valve of the present invention.

Referring to FIGS. 1 and 2, the valve of the present invention includes a primary body 1 and a secondary body 3. The primary body 1 includes a bore 5 connected to the outlet port 7. Piston 9 is disposed within bore 5 such that a portion of bore 5 is divided into a first chamber 11 above piston 9 and a second chamber 13 below piston 9. First chamber 11 is divided into first portion 11a adjacent from piston 9 and second portion 11b remote piston 9. Chamber partition 14 divides first chamber 11 into first portion 11a and second portion 11b.

The secondary body 3 includes a cavity 15 connected to both bore 5 of primary body 1 and the inlet port 17. The connection of cavity 15 of the secondary body 3 with bore 5 of the primary body 1 is through both throttle opening 19 and reference pressure passage 21. Specifically, reference pressure passage 21 connects first portion 11a of first chamber 11 of bore 5 to cavity 15 of secondary body 3. Also, throttle opening 19 connects second portion 11b of first chamber 11 and second chamber 13 of bore 5 to cavity 15 of secondary body 3.

Referring in detail to bore 5 of primary body 1, piston seat plate 23 is located in the bottom portion of the second chamber 13 of bore 5. Piston seat plate 23 has an opening 25 connected to outlet port 7 through which fluid in secondary chamber 13 passes. Piston seat plate 23 may be either integral with bore 5 or a separate element therefrom.

A spring or a plurality of springs 27 are situated on piston seat plate 23. Springs 27 also contact piston 9, preferably residing in spring holes 29 of piston 9, such that springs 27 bias piston 9 towards first chamber 11 of bore 5. The spring force provided by springs 27 set the differential between the fluid pressures in the first portion 11a of first chamber 11 ($P_1$) and the fluid pressure in the second portion 11b of the first chamber 11 and the second chamber 13 ($P_2$). The number and spring force of each of springs 27 can be changed to vary the aggregate spring force biasing piston 9 towards first chamber 11 to alter the differential pressure across the piston which in turn sets the differential pressure across the throttle opening 19.

Piston 9 includes end 31 which seats in opening 25 and which is shaped to vary the effective cross-sectional flow area of opening 25 of seat plate 23 as the relative position of piston 9 changes within bore 5. End 31 has a cross-sectional area substantially less than the cross-sectional area of the bore 5. Different piston seat plates 23 having openings 25 of varying sizes may be employed to alter the valve's responsiveness to downstream pressure fluctuations.

Optional seal 33 is a diaphragm seal located in first portion 11a of first chamber 11 of bore 5 around the upper side portion and the top portion of piston 9. Seal 33 prevents fluid leakage from first chamber 11 into second chamber 13. Seal 33 can also be another type of seal, such as an o-ring type seal or a cup seal. A cup seal may be employed for high pressures (e.g., above 1,000 psi).

Referring in detail to secondary body 3, cavity 15 contains inlet flow throttle 35 for regulating the fluid flow rate. Inlet flow throttle 35 is comprised of a stem 39 that is axially rotatable. Throttle opening 19 passes transversely through stem 39 and is oriented such that fluid flow from inlet 17 passes therethrough and then into second portion 11b of first chamber 11.

Axial rotation of stem 39 relative to body 3 varies the effective cross-sectional area of throttle opening 19 such that fluid flow therethrough is varied.

Cavity 15 of secondary body 3 also includes reference opening 43 which connects cavity 15 to reference pressure passage 21. As stated above, reference pressure passage 21 connects cavity 15 and first portion 11a of first chamber 11 of bore 5. Reference pressure passage 21 includes flow restriction point 45, which is a narrowing of reference pressure passage 21. Flow restriction point 45 adjusts the response time of the flow regulating valve to upstream pressure fluctuations by restricting the flow of the fluid between first portion 11a of first chamber 11 and cavity 15. The area of first chamber 11a is kept to a minimum to minimize the amount of "fluid packing". "Fluid packing" relates to the compressability of fluid. If less fluid is present, less fluid compression and "fluid packing" will occur, and the response time of the valve components to pressure fluctuations will be more precise. The effective cross-sectional fluid flow of flow restriction point 45 can be varied to acquire the desired degree of valve responsiveness. Narrowed flow restriction point 45 is able to adjust fluid flow, and thus control valve responsiveness during fluctuations of fluid pressure at inlet port 17, due to the relatively small cross-sectional area of narrowed flow restriction point 45 in relation to the surface area of piston 9 in first chamber 11 (area $A_1$). Specifically, narrowed flow restriction point 45 is preferably from about 0.01% to about 0.25% of area $A_1$. In contrast, valves having a reference passage that is 1.0% or more of the surface area of a piston comparable to piston 9 do not markedly affect valve responsiveness due to this large reference pressure passage (for example, U.S. Pat. No. 3,357,448 issued to Martin).

The flow regulating valve of the present invention operates based on the following force balance equations:

$$P_1 A_1 = P_2 A_2 + KX + P_3 A_3 \tag{1}$$

where $P_1$ = pressure in first portion 11a of first chamber 11 and cavity 15.

$A_1$ = area of piston 9 surface in the first chamber 11.

$P_2$ = pressure in second chamber 13 and second portion 11b of first chamber 11.

$A_2$ = area of piston 9 surface in second chamber 13 excluding piston end 31.

$KX$ = force of springs 27.

$P_3$ = pressure at outlet port 7.

$A_3$ = area of piston end 31 (or outlet area).

While $A_1 = A_2 + A_3$ because $A_3$ is a very small area relative to $A_2$, $A_2 \approx A_2 + A_3$ and:

$$A_1 \approx A_2 = A_{1=2} \tag{2}$$

substituting $A_{1=2}$ for $A_1$ and $A_2$ in equation (1) gives:

$$P_1 A_{1=2} = P_2 A_{1=3} + KX + P_3 A_3 \tag{3}$$

rearranging equation 3 gives:

$$(P_1 - P_2) A_{1=2} = KX + (P_3 A_3) \tag{4}$$

Because $A_3$ is small in relation to $A_2$, $P_3 A_3$ is negligible and equation (4) can be approximated as:

$$P_1 - P_2 = \frac{KX}{A_{1=2}}$$

Thus, the pressure differential ($P_1 - P_2$) between first portion 11a of first chamber 11 and second chamber 13 is substantially a function of spring force $KX$, which is constant. Also, $A_1$ and $A_2$ remain constant. The pressure differential between the first portion 11a of first chamber 11 and the second chamber 13 is therefore also substantially constant and is substantially independent of pressure fluctuations external to the flow regulator valve.

The flow regulator valve of the present invention operates as follows. Fluid passes through inlet port 17 at pressure $P_1$ and into cavity 15 of secondary body 3. This fluid then passes through reference opening 43, into reference pressure passage 21, into first portion 11a of first chamber 11 of bore 5 at pressure $P_1$ and exerts force on area $A_1$ of piston 9, $A_1$ being defined in equation (1), above.

Fluid from inlet port 17 at pressure $P_1$ also passes through inlet flow throttle 35, which regulates the fluid flow. This fluid then passes into the second portion 11b of first chamber 11 and the second chamber 13 of bore 5, which have the same pressure $P_2$ based on the flow restriction by piston end 31 in opening 25 of piston seat plate 23. Pressure $P_2$ exerts force on area $A_2$ of piston 9, $A_2$ being defined in equation (1) above. This fluid then passes through opening 25 of piston seat plate 23. After passing through opening 25, the fluid has a further reduced pressure of $P_3$, which is the outlet line pressure. The fluid at pressure $P_3$ exerts force on the relatively small area $A_3$ of piston end 9, $A_3$ being defined in equation (1), above.

At initial operation, piston end 31 seats in, and closes, opening 25 as fluid at pressure $P_1$ enters first portion 11a of first chamber 11 via reference pressure passage 21 and forces piston 9 downwards. Inlet flow throttle 35 is adjusted to attain a desired flow rate and fluid enters second chamber 13. Piston end 31 is unseated from opening 25 and piston 9 moves upwards to an equilibrium position where the force of the fluid pressure $P_1$ on piston area $A_1$ equals the force of the fluid pressure $P_2$ on piston area $A_2$ plus the spring force of springs 27; the force of the fluid pressure $P_3$ on piston end 31 area $A_3$ being essentially negligible compared to $A_2P_2$. This equilibrium condition, based on the effective flow cross-section of opening 25 as determined by the interaction of piston end 31 in opening 25, maintains a constant pressure differential between $P_1$ of first portion 11a of first chamber 11 and $P_2$ of second chamber 13.

The valve of the present invention, in one embodiment, includes piston guide rod 47 fixedly connected to piston 9 and matable into seat 49 in chamber partition 14. Seat 49 is oriented to slidably receive piston guide rod 47. Thus, reciprocation of piston 9 in bore 5 is guided by reciprocation of guide rod 47 in seat 49 of chamber partition 14. In this manner, piston 9 is stabilized in bore 5 during reciprocation, and piston 9 can function over a longer stroke than comparable pistons not employing a guide rod and guide rod collar.

While particular embodiments of the present invention have been described in some detail above, changes and modifications may be made in the illustrated embodiments without departing from the form or spirit of the invention. It is therefore intended that the following claims cover all equivalent modifications and variations as fully within the scope of the invention as defined by the claims.

I claim:

1. A pressure independent fluid flow regulating valve comprising:
    a valve body having an inlet and an outlet forming a flow passage through said valve body;
    a piston mounted in a bore intersecting said flow passage, said piston dividing said bore into first and second chambers, said inlet and said outlet connected with said second chamber, said first chamber divided into a first portion and a second portion, said second portion of said first chamber and said second chamber having substantially equal fluid pressure during operation;
    outlet varying means on said piston for varying the cross-sectional area of said outlet based on the pressure differential between said first chamber and said second chamber;
    a reference pressure passage connected to said inlet and to said first chamber of said bore;
    an adjustable throttle means disposed in said flow passage for varying the cross-sectional area of said flow passage; and
    spring means biasing said piston toward said reference pressure passage.

2. The valve of claim 1 further comprising:
    a chamber partition in said bore dividing said first portion and said second portion.

3. The valve of claim 1 wherein said reference pressure control passage is narrowed for controlling responsiveness of said valve during fluctuation of pressure at said inlet.

4. The valve of claim 1 further comprising:
    means for guiding reciprocation of said piston in said bore, said means for guiding reciprocation including an elongate member on said piston, and a seat in said bore, said seat adapted to receive said elongate member whereby reciprocation of said piston in said bore is guided by reciprocation of said elongate member in said seat.

5. The valve of claim 4 wherein said seat is located in a chamber partition in said bore, said chamber partition dividing said first chamber into a first portion and a second portion.

6. A pressure independent fluid flow regulating valve comprising:
    a valve body having an inlet and an outlet forming a flow passage through said valve body;
    a piston mounted in a bore intersecting said flow passage, said piston dividing said bore into first and second chambers, said inlet and said outlet connected with said second chamber, said first chamber divided by a chamber partition into a first portion and a second portion, said second portion of said first chamber and said second chamber having substantially equal fluid pressure during operation;
    outlet varying means on said piston for varying the cross-sectional area of said outlet based on the pressure differential between said first chamber and said second chamber;
    a reference pressure passage connected to said inlet and to said first chamber of said bore;
    an adjustable throttle means disposed in said flow passage for varying the cross-sectional area of said flow passage;
    spring means biasing said piston toward said reference pressure passage; and
    means for guiding reciprocation of said piston in said bore, said means for guiding reciprocation including an elongate member on said piston, and a seat in said bore, said seat adapted to receive said elongate member whereby reciprocation of said piston in said bore is guided by reciprocation of said elongate member in said seat.

7. The valve of claim 6 wherein said reference pressure control passage is narrowed for controlling responsiveness of said valve during fluctuation of pressure at said inlet.

8. The valve of claim 6 wherein said seat is located in said chamber partition in said bore.

9. A pressure independent fluid flow regulating valve comprising:
- a valve body having an inlet and an outlet forming a flow passage through said valve body;
- a piston mounted in a bore intersecting said flow passage, said piston dividing said bore into first and second chambers, said inlet and said outlet connected with said second chamber;
- outlet varying means on said piston for varying the cross-sectional area of said outlet based on the pressure differential between said first chamber and said second chamber;
- a narrowed reference pressure passage connected to said inlet and to said first chamber of said bore for controlling responsiveness of said valve during fluctuation of pressure at said inlet;
- an adjustable throttle means disposed in said flow passage for varying the cross-sectional are of said flow passage;
- spring means biasing said piston toward said reference pressure passage; and
- means for guiding reciprocation of said piston in said bore, said means for guiding reciprocating including an elongate member on said piston, and a seat in said bore, said seat adapted to receive said elongate member whereby reciprocation of said piston in said bore is guided by reciprocation of said elongate member in said seat.

10. The valve of clam 9 wherein said first chamber is divided into a first portion and a second portion, said second portion of said first chamber and said second chamber having substantially equal fluid pressure during operation.

11. The valve of claim 10 further comprising:
- a chamber partition in said bore dividing said first chamber into said first portion and said second portion.

12. The valve of claim 9 wherein said seat is located in a chamber partition in said bore, said chamber partition dividing said first chamber into a first portion and a second portion.

* * * * *